(12) United States Patent
Moore et al.

(10) Patent No.: US 7,646,724 B2
(45) Date of Patent: Jan. 12, 2010

(54) DYNAMIC BLOCKING IN A SHARED HOST-NETWORK INTERFACE

(75) Inventors: Thomas D. Moore, Raleigh, NC (US);
Bruce H. Ratcliff, Red Hook, NY (US);
Jerry W. Stevens, Raleigh, NC (US);
Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 10/435,882

(22) Filed: May 12, 2003

(65) Prior Publication Data

US 2004/0228280 A1 Nov. 18, 2004

(51) Int. Cl.
*H04L 1/00* (2006.01)
(52) U.S. Cl. .................. 370/252; 370/254; 709/203; 709/213; 709/219; 709/239
(58) Field of Classification Search .............. 370/420, 370/252, 254; 709/203, 213, 219, 239
See application file for complete search history.

(56) References Cited

U.S. PATENT DOCUMENTS

| | | | |
|---|---|---|---|
| 5,590,285 A | 12/1996 | Krause et al. | |
| 5,671,442 A | 9/1997 | Feeney et al. | |
| 5,751,712 A | 5/1998 | Farwell et al. | |
| 5,859,837 A | 1/1999 | Crayford | |
| 6,003,088 A * | 12/1999 | Houston et al. | 709/230 |
| 6,078,964 A | 6/2000 | Ratcliff et al. | |
| 6,092,108 A | 7/2000 | DiPlacido et al. | |
| 6,105,064 A * | 8/2000 | Davis et al. | 709/224 |
| 6,208,616 B1 | 3/2001 | Mahalingam et al. | |

(Continued)

OTHER PUBLICATIONS

Network Sorcery "TCP, Transmission Control Protocol" pp. 1 and 2. May 21, 2000.*

(Continued)

*Primary Examiner*—Seema S Rao
*Assistant Examiner*—Sai-Ming Chan
(74) *Attorney, Agent, or Firm*—Lynn L. Augspurger; Steven Chiu

(57) ABSTRACT

A method, system, and program product for a data processing system having multiple hosts which dynamically determines blocking of packets in the data processing system. A connection is established between a host and an adapter for communication with a Local Area Network. A set of parameters is established for blocking packets transmitted from the adapter to the host. The set of parameters is stored in the adapter to be used by that connection. The packets transmitted from the adapter to the host are grouped or blocked in accordance with the set of parameters for that connection. Periodically, the packets being transmitted from the adapter to the host are evaluated for determining changes in the parameters. Changes to the set of parameters are recorded in the adapter for that connection to the host. Where there are multiple connections established between the adapter and multiple hosts, a set of parameters to be used for each connection is established such that packets are blocked in accordance with a respective set of parameters for a respective one of the hosts.

8 Claims, 2 Drawing Sheets

U.S. PATENT DOCUMENTS

| | | | |
|---|---|---|---|
| 6,252,881 B1 | 6/2001 | Samoylenko | |
| 6,289,388 B1 | 9/2001 | Disney et al. | |
| 6,314,525 B1 | 11/2001 | Mahalingham et al. | |
| 6,600,743 B1* | 7/2003 | Lee et al. | 370/390 |
| 2001/0021950 A1* | 9/2001 | Hawley et al. | 709/225 |
| 2002/0099854 A1* | 7/2002 | Jorgensen | 709/249 |

OTHER PUBLICATIONS

Network Sorcery "Tcp, Transmission Control Protocol" pp. 1 and 2. May 21, 2000.*

RM Hopko et al "Microprocessor-Assisted Channel Interface Controller for a Multipath Channel-to-Channel Adapter", IBM Technical Disclosure Bulletin, Vol. 24, No. 7A, Dec. 1981, pp. 3357-3364.

* cited by examiner

DYNAMIC BLOCKING IN A SHARED HOST-NETWORK INTERFACE

BACKGROUND OF THE INVENTION

The present invention is related to a computer environment wherein many hosts running in the Central Electronic Complex (CEC) of the computer are sharing an adapter connecting the CEC to a Local Area network (LAN), and is more particularly related to dynamically determining the most efficient number of packets that can be grouped together for network traffic flowing from the hosts to the LAN.

In an adapter sharing environment, many Hosts have connections to the same NIC (Network Interface Adapter). At any one time, the packet and data rates of the network traffic flowing across any of these connections can change. The NIC must be sensitive to these rates since it is being shared by many Hosts. The number of packets grouped together (blocked) as they are transferred across the Main Memory bus from the NIC can have a huge impact on the overall performance of a connection. The amount of time a packet is delayed by the NIC can also have a huge impact on the performance. Some applications are sensitive to latency where others are more throughput oriented. In the shared NIC environment, both sets of applications can be running through the same adapter at the same time. This makes the blocking decisions in this environment even more critical. The NIC must be able to provide the best Blocking Algorithm for a specific application. The Blocking Algorithm used on one connection might not be the most optimal Blocking Algorithm on another connection. The NIC must be able to dynamically learn the best Blocking Algorithm for each application and be able to run different Blocking Algorithms to different applications at the same time. Static Blocking Algorithms cannot be used in this environment.

BRIEF SUMMARY OF THE INVENTION

An object of the present invention is to provide a Blocking Algorithm that can be configured to dynamically change over time.

It is a further object of the invention to provide a Blocking Algorithm that can be different for each Device Driver connection and the dynamics of each connection can/will be different.

It is a further object of the present invention to provide for storing a set on parameters in an adapter for each connection between the adapter and a host in a data processing system, each set of parameters for use with a Blocking Algorithm for that connection.

BRIEF DESCRIPTION OF THE SEVERAL VIEWS OF THE DRAWING

These and other objects will be apparent to one skilled in the art from the following detailed description of the invention taken in conjunction with the accompanying drawings in which.

DETAILED DESCRIPTION OF THE INVENTION

Figure 1:
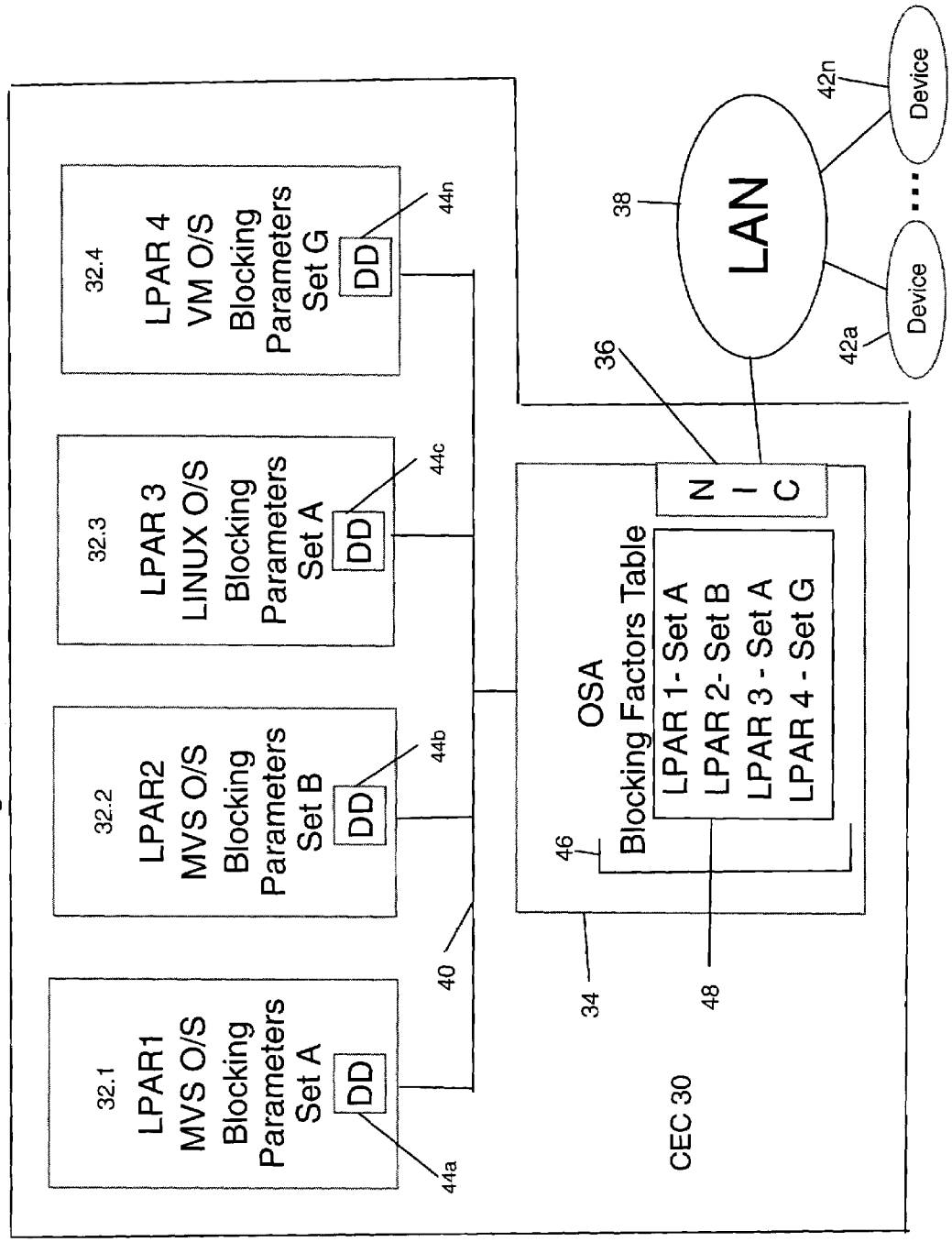
FIG. 1 is a schematic diagram of a data processing system having multiple hosts sharing an adapter for connection to a Local Area Network.

FIG. 1 is a schematic diagram of a multipartitioned Central Electronic Complex (CEC) 30 having multiple host images, for instance host images 32.1 to 32.4, and an Open Systems Adapter (OSA) 34. The number of host images 32.1 to 32.4 was chosen to make the illustration simpler. It will be understood that the number of host images may be less or more than 4, as desired. The OSA 34 includes a Network Interface Card (NIC) 36 connected to a Local Area Network (LAN) 38. As is well understood, each host image 32.1-32.4 may contain a different operating system. For instance, host images 32.1 (LPAR1) and host image 32.2 (LPAR2) may have an IBM MVS Operating System (O/S), host image 32.3 (LPAR3) may have a Linux O/S, and host image 32.4 (LPAR4) may have an IBM VM O/S. These operating systems are well understood, and will not be discussed further.

These host images, which reside in the main memory of the CEC 30, are connected to an Open Systems Adapter (OSA) 34 by a Main Memory bus 40, as is well known. The OSA 34 contains a Network Interface Adapter (NIC) card 36 which includes an interface for connecting to the LAN 38.

A number of devices 42a-42n may be connected to the LAN 38. Each host 32 contains one or more device drivers (DD) 44a-44n which are used by the hosts 32 to drive the devices 42, as is well known.

As mentioned, the number of packets grouped together (blocked) as they are transferred across the Main Memory bus 40 from the NIC 36 can have a huge impact on the overall performance of a connection. The amount of time a packet is delayed by the NIC 36 can also have a huge impact on the performance. Some applications are sensitive to latency where others are more throughput oriented. In the shared NIC environment, both sets of applications can be running through the same OSA 34 at the same time. This makes the blocking decisions in this environment even more critical. The NIC 36 must be able to provide the best Blocking Algorithm for a specific application.

Thus, there is a need for having different Blocking Algorithms for different applications run by the hosts 32. Some applications are latency sensitive and others are throughput sensitive.

There is also a need for each connection being able to dynamically set and adjust the Blocking Algorithm. To provide the most efficient Blocking Algorithm, a blocking criteria must be set. The criteria may include the Inter-Packet Gap Time and the Maximum Block Delay Time. The Inter-Packet Gap Time is the maximum time the NIC 36 will wait between packets for a specific interface before forwarding an "in progress" block to the Host. The Maximum Block Delay Time is the maximum time an "in progress" block will be delayed by the NIC 36. These rules are referred to as the interpacket gap and maximum block delay time respectively. The Blocking Algorithm must also determine cases when no blocking should occur at all. History information such as packet rates over specific time intervals, size of packets received on an interface and adapter utilization also have an effect on the Blocking Algorithm.

A Host to Adapter interface 46 allows for the setting and updating of the Blocking Algorithm. When a Host Device Driver 44 establishes a connection to the shared NIC 36, the initial Blocking Algorithm settings are made. These include the Inter-Packet Gap Time and Maximum Block Delay Time. For the Inter-Packet Gap Time, two different values are configurable due to the large range (1-9K for Ethernet) of frame sizes which can be transmitted. One value is for frames up to 1500 bytes. The second value is for frames up to 9K bytes.

The Minimum Packet Size, Maximum Block Size, Maximum Frames Size, the No Blocking Flag and TCP Header Flag are some other configurable options. The Minimum Packet Size parameter is used to force the forwarding of blocks when a packet under a certain size is received. The Maximum Block Size limits the size of the data contained in the block. The Maximum Frames Size limits the number of LAN packets which can be contained within a Block. A No Blocking Flag disables blocking for a specific connection. The TCP Header Flag option is used to force the forwarding of blocks when a TCP packet has a specific bit set in the TCP Header (for example the Acknowledge Character (ACK) and the Synchronous Idle Character (SYN) flags for the ACK and SYN to be used in this connection).

Once a Device Driver 44 establishes a connection, data throughput statistics (packets per second and bytes per second) are gathered per connection every 10 ms. These statistics are used to dynamically modify the Blocking Algorithm when necessary.

The Host to Adapter interface 46 includes a blocking factors table 48 which includes an entry for the set of parameters to be used for each LPAR connection. For instance, as shown in FIG. 1, the blocking factors table 48 includes entries showing that parameter Set A should be used for LPAR1 and LPAR3 (32.1 and 32.3), Set B should be used for LPAR2 (32.2), and Set G should be used for LPAR4 (32.4).

A summary of the Parameter Set is as follows:
Maximum packet size
Minimum packet size
Interpacket gap
Maximum blocking time
TCP header flag
   ACK
   SYN
   Etc.
Packet sequence number
No blocking flag The Blocking Algorithm runs in the OSA 34. Each host 32 has a copy of its blocking settings, and the host will periodically evaluate/update its blocking parameters which are stored in the OSA 34, as will be explained. When the OSA 34 is shared by multiple images within the CEC 30, there will be one algorithm (each having its unique criteria) for each connection to the OSA 34. The OSA 34 dynamically blocks packets based on the criteria established by the host connection.

The Blocking Algorithm does the following:
1. The initial Blocking Algorithm values are:
interpacket gap for 1500 byte frames=>100 us
interpacket gap for 1501 to 9K frames=>200 us
maximum block delay time=>2 ms
minimum packet size=>100 bytes
maximum frames size=>30
All other parameters are set to default values which means they are not used.

2. When the shared NIC receives the first packet for the connection, the initial block is sent up to the Host as a "wake up" block to notify the Host data has started to arrive on the connection. After the first packet is received, the Blocking Algorithm is started.

3. When the next packet arrives, the packet is time stamped and the Block Start Time is recorded. A new block is initiated and the packet is held by the shared NIC. For this example, the packet size is 1500 bytes.

4. When the next packet arrives, the delta time between the previous packet and the current packet is compared to the interpacket gap. If the delta time is less than the current interpacket gap time, then this parameter does not trigger the block to be sent to the Host. For our example, the delta value for this packet is 10 us, so the block is not forwarded to the Host. The current packet time is then saved to compare against the next packet received.

The delta between the Block Start Time and the current time are then checked. For our example, the delta is less than the Maximum Block Delay Time, so the block is not forwarded to the Host.

The packet size is then compared to Minimum Packet Size. If the packet size is less than the minimum packet size, then the block is forwarded to the Host. Since the size of the packet received is 1500 bytes, it is not less than 100 bytes, so the block is not forwarded to the Host.

The current number of frames in the block is then compared to the Maximum Frames Size. If the value is equal to this value, then the block is forwarded to the Host. Since the value is 2, the block is not forwarded.

5. The interpacket gap for the next packet is 25 us and the size is 1000 bytes, so the packet is added to the block and all the blocking criteria is met, so the block is not forwarded to the Host.

6. The interpacket gap for the next packet is 10 us and the packet size is 64 bytes. Since the packet size is less than the Minimum Packet Size, the block is then sent up to the Host.

7. When the next packet arrives, a new block is started and the Block Start Time and packet arrival time are set. This packet arrives and its size is 8K in length. The interpacket gap time is now set to the 9K value, or 200 us.

8. The interpacket gap for the next packet is 140 us and the size is again 8K. Since this is under the 200 us interpacket gap time, the packet is added to the current block.

9. After 200 us, no packets have arrived. All active blocks are checked every 10 us to determine if the interpacket gap has been exceeded. Since no packets have arrived for this connection, the current block will be forwarded to the Host.

10. Every 10 ms, the packets per second and bytes per second values per connection are checked. If after 100 ms, no data has arrived on a specific connection, the Blocking Algorithm is disabled until the next packet arrives for the connection. When a packet does arrive, it is immediately sent to the Host. The flow starts over with step 2 above.

11. At any time during the flow, the Host can modify the current Blocking Algorithm dynamically based on the packets and bytes per second statistics the Device Driver has gathered.

Figure 2:
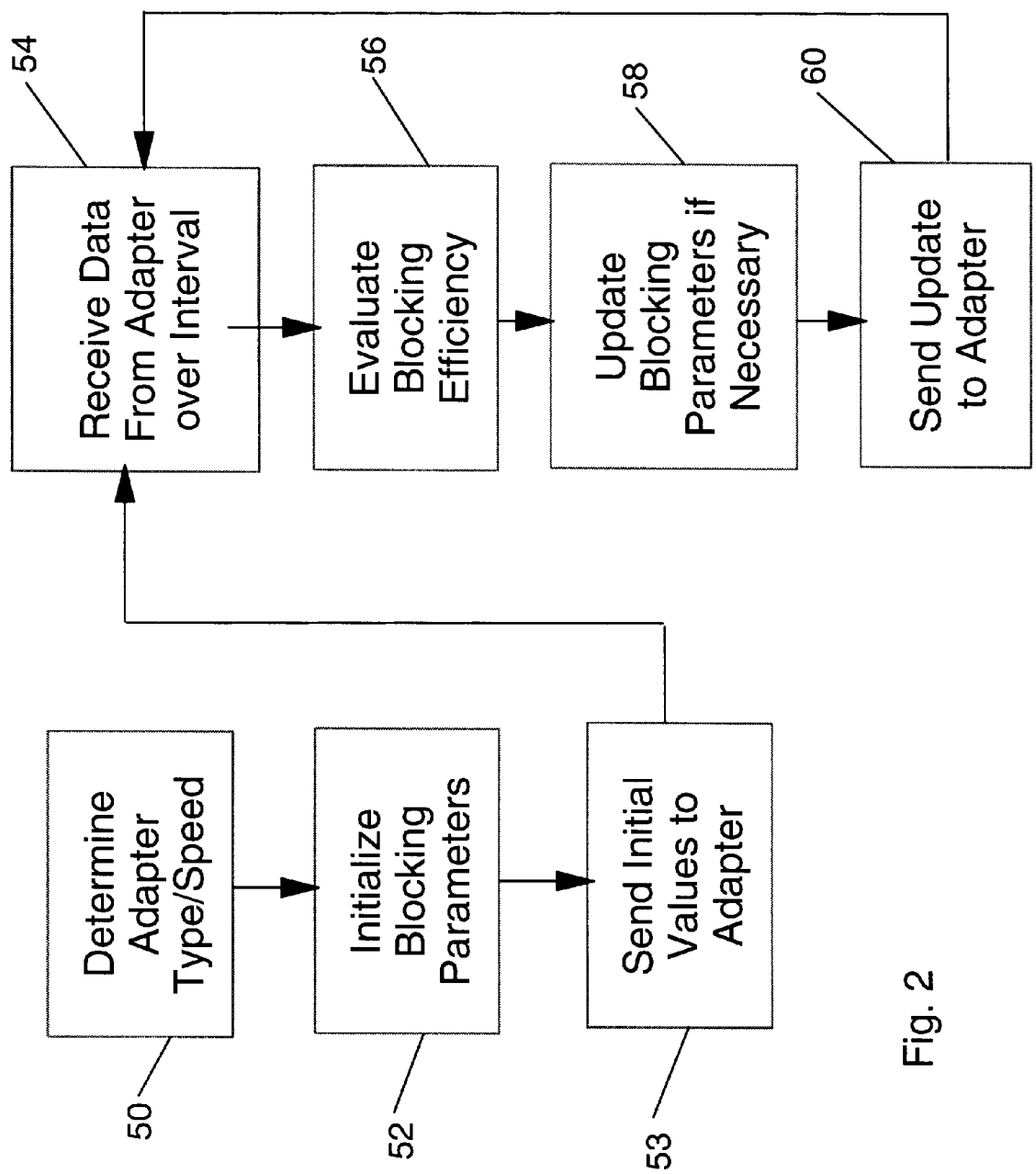
FIG. 2 is a flowchart for a Blocking Algorithm usable with the system of FIG. 1.

A flowchart for the Blocking Algorithm is shown in FIG. 2. At 50, the algorithm determines the type and speed of the adapter 36. At 52, the blocking parameters of the set of parameters for this LPAR is initialized. At 53, the initial values of the set are sent to the OSA 34 to be used for this connection and stored in the table 48. At 54, the data collected by the OSA 34 over the interval set by the algorithm (maximum blocking time) is sent to the algorithm. At 56, the blocking efficiency is evaluated by the algorithm to determine if the blocking parameters should be updated. At 58, if the algorithm determines that the parameters should be updated, the parameter set in the table 48 are updated for this connection. At 60, the updated parameters are sent to the OSA 34 for storage in the table 48, and to be used for this connection. It can thus be seen that the parameters are updated dynamically.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. In a data processing system having multiple hosts, a method for dynamically determining blocking of packets in the data processing system, the method comprising:

establishing a connection between a host and an adapter for communication with a Local Area Network;

establishing a set of parameters for blocking packets transmitted from the adapter to the host;

storing the set of parameters in the adapter to be used by that connection;

blocking the packets transmitted from the adapter to the host in accordance with the set of parameters for that connection, wherein blocking comprises comparing one or more of the parameters to a first time period defined as a time interval between receipt of packets, and comparing one or more of the parameters to a second time period defined as a time interval between start of blocking of packets and receipt of a subsequent packet;

periodically evaluating the packets transmitted from the adapter to the host for determining changes in the parameters; and based on the evaluation, changing the set of parameters recorded in the adapter for that connection to the host.

2. The method of claim 1 further comprising establishing multiple connections are established between the adapter and multiple hosts, and establishing a set of parameters to be used for each connection established such that packets are blocked in accordance with a respective set of parameters for a respective one of the hosts.

3. The method of claim 1 wherein the set of parameters includes:

a maximum packet size;
a minimum packet size; and
a maximum blocking time.

4. The method of claim 3 wherein the set of parameters further comprises:

an interpacket gap;
TCP header flags including an ACK and a SYN;
a packet sequence number; and
a no blocking flag for indicating if blocking is or is not being used.

5. A data processing system having multiple hosts and dynamically determining blocking of packets in the data processing system, the data processing system comprising: an adapter for communication with a Local Area Network;

a connection between the adapter and the host; a set of parameters stored in the adapter for blocking packets transmitted from the adapter to the host;

a transmitter in the adapter blocking the packets transmitted from the adapter to the host in accordance with the set of parameters for that connection, wherein blocking comprises comparing one or more of the parameters to a first time period defined as a time interval between receipt of packets, and comparing one or more of the parameters to a second time period defined as a time interval between start of blocking of packets and receipt of a subsequent packet; and an evaluator periodically evaluating the packets transmitted from the adapter to the host for determining changes in the parameters, said evaluator, based on said evaluation, transmitting changes to the adapter for changing the set of parameters recorded in the adapter for that connection to the host.

6. The system of claim 5 further comprising multiple connections between the adapter and multiple hosts, and a set of parameters for each connection established such that packets are blocked in accordance with a respective set of parameters for a respective one of the hosts.

7. The system of claim 5 wherein the set of parameters comprises:

a maximum packet size;
a minimum packet size; and
a maximum blocking time.

8. The system of claim 6 wherein the set of parameters further comprises:

an interpacket gap;
TCP header flags including an ACK and a SYN;
a packet sequence number; and
a no blocking flag for indicating if blocking is or is not being used.

* * * * *

UNITED STATES PATENT AND TRADEMARK OFFICE
CERTIFICATE OF CORRECTION

PATENT NO. : 7,646,724 B2
APPLICATION NO. : 10/435882
DATED : January 12, 2010
INVENTOR(S) : Moore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1812 days.

Signed and Sealed this

Sixteenth Day of November, 2010

David J. Kappos
*Director of the United States Patent and Trademark Office*